Feb. 6, 1951 — H. S. MANWARING — 2,540,273
FILTER ELEMENT
Filed Dec. 6, 1945 — 3 Sheets-Sheet 1
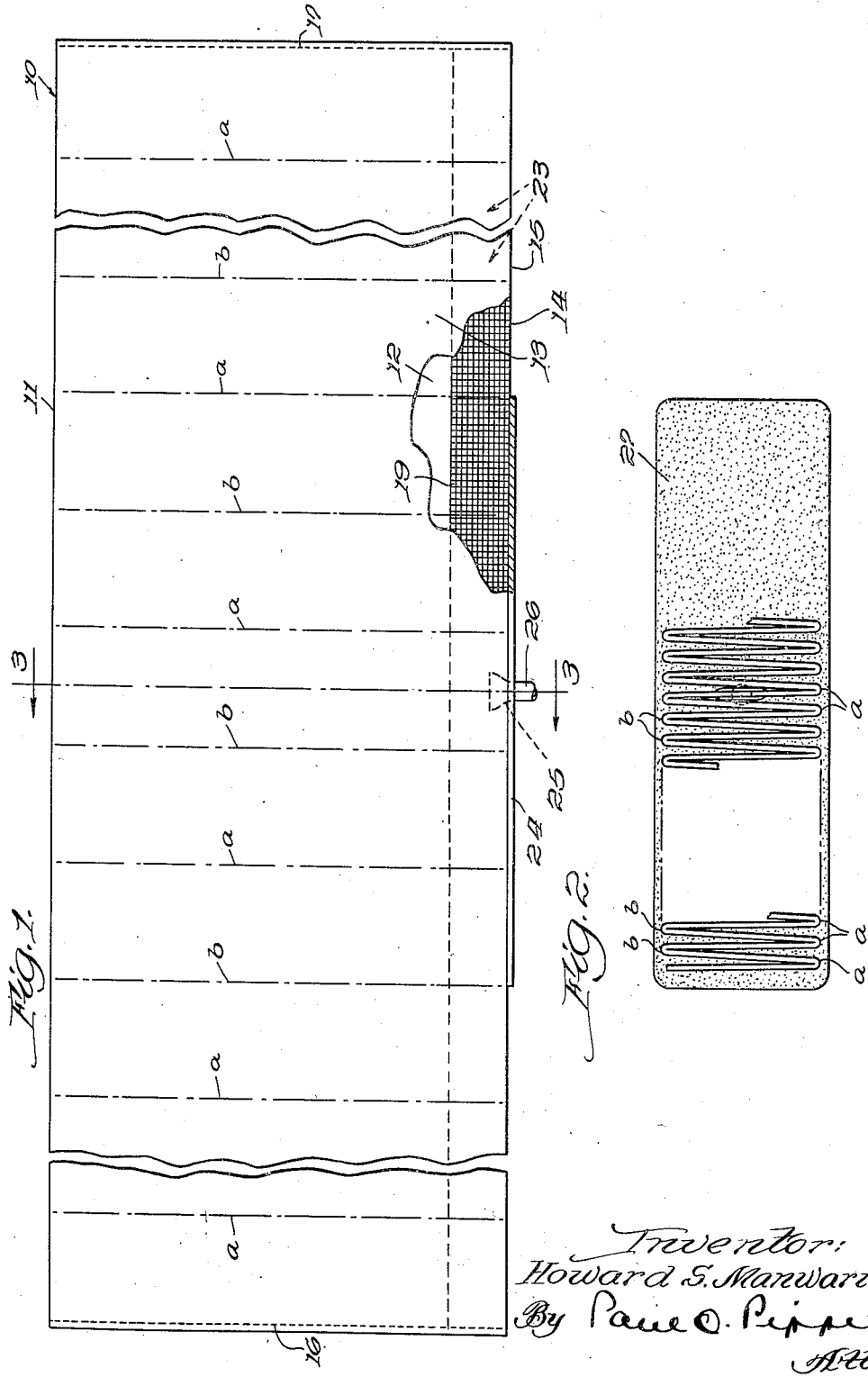
Inventor:
Howard S. Manwaring.
By Paul O. Pippel
Atty.

Feb. 6, 1951     H. S. MANWARING     2,540,273
FILTER ELEMENT
Filed Dec. 6, 1945     3 Sheets-Sheet 2
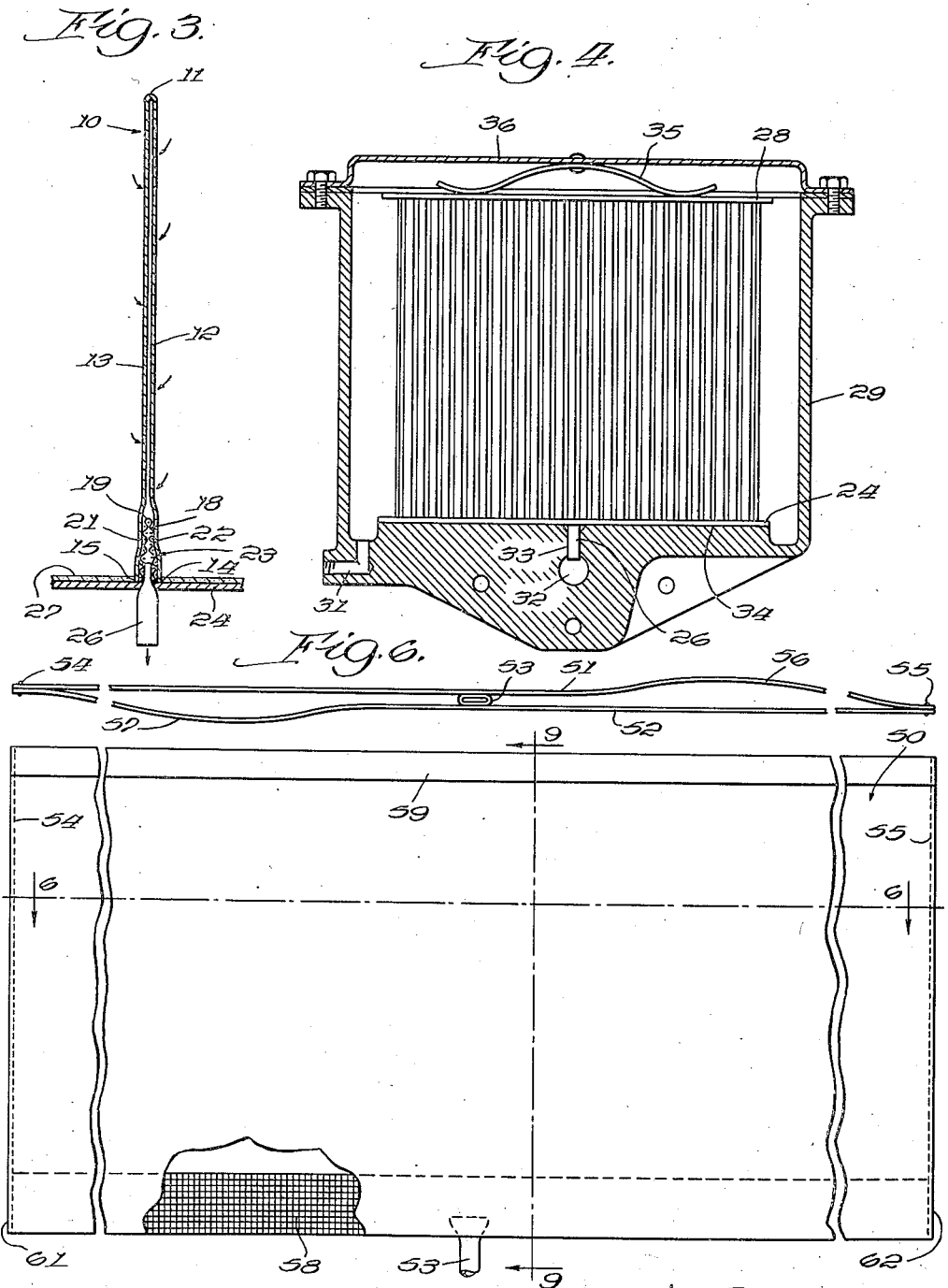
Inventor:
Howard S. Manwaring.
By Paul O. Pippel
Atty.

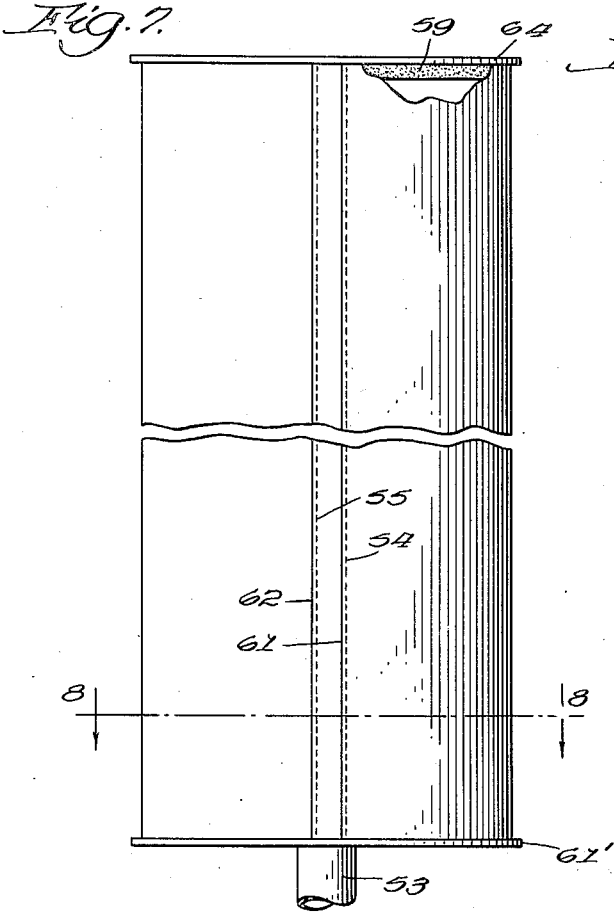
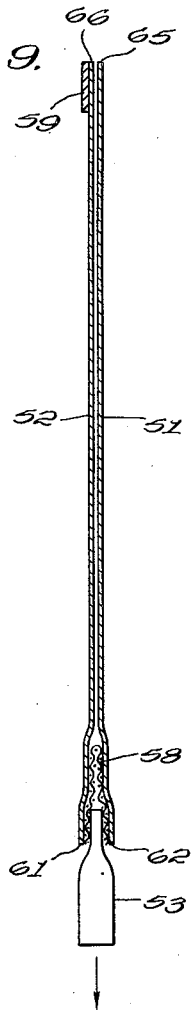
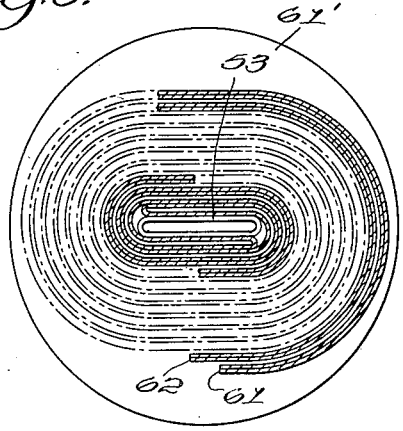

Patented Feb. 6, 1951

2,540,273

UNITED STATES PATENT OFFICE 2,540,273

FILTER ELEMENT

Howard S. Manwaring, La Grange, Ill., assignor to International Harvester Company, a corporation of New Jersey Application December 6, 1945, Serial No. 633,198

5 Claims. (Cl. 210—169)

This invention concerns fluid-filtering devices of the type including an envelope of thin filtering walls urged collapsed by an ambient body of fluid filterable inwardly therethrough and relates more particularly to drainage structure for the envelope.

An important object of the invention is the provision of a novel filter envelope employing bendable side wall separating means within a drainage passage to assure the open condition of such passage when the envelope is bent into a contracted condition and to adapt the contracted envelope for drainage through a tube or stem which extends from said passage outwardly of the envelope between separated edges of its side walls. This form of drainage structure makes it possible to conveniently produce an effective seal between the envelope and the drainage stem without imposing limitations upon the folding or convolutional pattern adapted for contracting the envelope.

As an expedient for adapting the separating means for conformance to the filter envelope wall bent as desired for contracting, another object of the invention contemplates a flat separating means formed from a plurality of flexible reticulated layers. Using a plurality of such layers prevents excessive throttling of the drainage passage when the envelope walls are pressed against the layer filaments by pressure of the ambient fluid. The flat separating means also minimizes distortion of the envelope walls so no special problems are created in providing sealed connections between said walls at any of their edges.

A further object is the provision of a discharge stem flattened at its portion between the envelope side walls to avoid distortion thereof for the reasons explained in the next preceding object.

Still a further object is the provision of a filter envelope wherein the drainage passage extends along an edge whereby the separating member retains the corresponding edges of the envelope side walls spread, together with a sealing plate secured in abutting sealing relation with said wall edges to supplement the separating member in holding the passage open.

These and other desirable objects inherent in and encompassed by the invention will be better understood after reading the ensuing description with reference to the annexed drawings, wherein:

Figure 1 is a plan view of a filtering envelope, in the flat condition, employed in a preferred embodiment of the invention.

Figure 2 is an end view of a filter device made from the envelope of Figure 1 and illustrating a manner of folding the envelope into a series of zig-zag convolutions for contracting the same into a more practically closable space.

Figure 3 is a sectional view taken through the envelope on the line 3—3 of Figure 1.

Figure 4 is a sectional view taken through a casing having installed therein a filtering unit of the type illustrated in Figures 1 to 3.

Figure 5 is a view taken similarly to Figure 1 of a second envelope constructed in a manner facilitating its winding into a series of generally circular convolutions of the character illustrated in Figure 8.

Figure 6 is a sectional view taken on the line 6—6 of Figure 5.

Figure 7 is a side elevational view of a filtering unit embodying the envelope of Figure 5 rolled into a contracted spiral formation.

Figure 8 is a sectional view taken on the line 8—8 of Figure 7.

Figure 9 is a sectional view taken on the line 9—9 of Figure 5.

The first embodiment comprises a filtering envelope 10 which at a preliminary stage in the fabrication of the unit is in the flat condition illustrated in Figure 1. Said envelope is preferably made of filter paper treated with a substance such as a phenolic resin for giving it a character of permanent "wet" strength. Envelope 10 is formed from a single sheet of filtering medium bent over 180° along a fold line 11 extending lengthwise of and forming the upper edge of the envelope in Figure 1. There are thus formed two flat contiguously disposed filtering side walls 12 and 13 having unsecured lower edges 14 and 15. The ends of the side walls 12 and 13 are sewed together by stitching 16 and 17. At this stage in the fabrication of the filtering unit the envelope 10 is closed at all edges excepting the edge coinciding with the side wall edges 14 and 15.

The side walls 12 and 13 are slightly separated along the lower edge of the envelope by a separator and drainage structure 18 which consists of an elongated reticulated member folded 180° about a fold line 19 forming its upper edge and disposed flatwise to and between opposed narrow portions of said side walls extending marginally along the separated edges of such walls. Two layers 21 and 22 of the reticulated material are thus disposed between the lower edge portions of the envelope side walls 12 and 13 for cooperating therewith in the formation of a drainage passage 23. In Fig. 1 it can be seen that the narrow elongated passage 23 extends marginally along the envelope's lower edge coincident with the wall edges 14—15, and that this passage extends from positions adjacently to the opposite ends which are respectively stitched at 16 and 17. The reticulated member may be a coarsely woven cloth or netting, and the filaments thereof may be of coarse thread or string and they may be plastic fibers. It is essential that the reticulated member be bendable and preferably so readily bendable as to have a flexible character approximating that of cotton fabric. The open meshes in the reticulated element are preferably quite large, for example, the dimensions approach those meshes in ordinary window screen.

Subsequent to the insertion of the reticulated structure, the envelope is bent along the fold lines $a$ and $b$ into the zig-zag formation illustrated in Figure 2. There is then assembled with the contracted member a rectangular sealing plate 24 containing a hole 25 through which there extends a drainage stem 26. The upper end of this drainage stem is flattened to facilitate its insertion between the lower edges of the envelope side walls and into the drainage passage 23; also see Figure 3. Preferably the flattened upper end of the stem is inserted between the drainage structure layers 21 and 22 so the arrangement will be symmetrical. A sealing compound such as a resinous material which becomes plastic when heated forms a layer 27 on the upper surface of the sealing plate 24 so that by pressing the lower edges of the convoluted side walls 12 and 13 against the layer 27 during the application of heat to such layer, these edges of the side walls are caused to be secured to the sealing plate in a hermetically sealed relation. Since the reticulated separator member holds these lower side wall edges 14 and 15 separate at the time they are secured in sealed relation to the plate 24, the plate supplements said member in maintaining the side wall edges 14 and 15 separated when the filtering unit is in use and thereby contributes to the open condition of the drainage passage 23.

In Figure 4 where the filtering unit is shown assembled with a suitable casing in which the unit is replaceably usable, an upper plate 28 is shown attached to the upper end of the unit. This plate 28 may be a duplicate of the plate 24 and adhesively secured to the upper ends of the envelope convolutions by the adhesive layer. Plate 28 serves simply as a strengthening member for the unit since the upper edge of the envelope is already closed at the integral union of the envelope side walls 12 and 13.

The casing 29 in Figure 4 has an inlet channel 31 in its base for the introduction of unfiltered mediums such as oil. An exhaust channel 32 in the bottom of the casing is for the reception and exhaust of oil which has been filtered by the filtering unit. Exhaust passage 32 includes a bore 33 for receiving the stem 26 of the discardable filtering unit. A flat face 34 in the bottom of the casing is for fitting flatly against the under side of the unit bottom plate 24. Initial pressure for maintaining the bottom plate 24 in sealing relation with the casing bottom face 34 is provided by a leaf spring 35 which is secured to a removable cover 36 of the casing and implements this spring 35 bearing downwardly upon the upper plate 28 of the unit.

When the filtering unit is in operation, it will be completely immersed by fluid introduced into the casing through the inlet channel 31. The fluid presses against the envelope walls 12 and 13 and thus urges them each against the other and consequently urges the envelope into a collapsed condition. Because of the envelope walls being pressed together by the pressure of the fluid ambient hereto, these walls reenforce one another and prevent rupture at much higher pressures than which they would otherwise withstand. While the envelope side walls are pressed together, they do not block the flow of fluid which filters therethrough into the zone enclosed therebetween. Such non-blocking of the flow of filtered fluid entering the envelope is attained by roughening the inner surfaces of these walls so that interstitial passages exist for the oil so it can flow through them downwardly to the drainage passage 23. This flow pattern of the fluid into the envelope and downwardly into the drainage passage is illustrated by the arrows in Figure 3. The distance from the upper edge 11 of the member downwardly to the drainage passage 23 is not so great but what a sufficient flow capacity is provided by the interstitial drainage network. Once the filtered fluid has reached the passage 23 which is maintained in an open condition by the separator structure 21—22, the fluid can flow lengthwise of the envelope through the tortuous passage 23. Drainage tube 26 is placed at an intermediate point in the passage 23 so that the maximum distance of flow through said passage will be half the length of the envelope. The filtered fluid entering the stem 26 from the drainage passage enters the discharge channel 32 of the casing.

An important advantage of the filtering element described resides in the expediency with which the edges of the envelope can be secured and particularly the lower edges 14 and 15 which throughout the entire length are adapted to contact the adhesive layer 27 on the sealing plate 24. Utilization of the flat flexible separator construction 21—22 avoids distortion of the envelope side walls sufficiently to not interfere with the continuity of contact between the side wall edges 14 and 15 and the adhesive coated side of the plate 24. Neither is this continuity of contact disrupted by the flattened upper end of the drainage stem 26.

Utilization of the flat flexible wall separator and drainage structure 21—22 in no way interferes with the bending of the envelope side walls into the desired configuration pursuant to contracting the envelope into a readily enclosed space. Using a plurality of layers 21 and 22 of the reticulated structure avoids the contingency of the side walls being pressed or indented sufficiently far into the separator structure to prohibitively diminish the flow capacity of the drainage passage 23.

The second embodiment illustrated in Figures 5 to 9 includes a filtering envelope 50 constructed similarly to the member 10. However, envelope 50 is not provided with fold lines $a$ and $b$, and the side walls 51 and 52 which respectively correspond to the side walls 12 and 13 are initially assembled with the flattened end of a drainage tube 53 corresponding to the drainage tube 26. Also the upper edges of the side walls 51 and 52 are initially detached as shown in Figure 9. Although the side walls 51 and 52 are of the same length so that their ends are sewed together by lines of stitching 54 and 55, a greater length of the wall 52 is disposed to the left of the drainage tube 53 as illustrated in Figures 5 and 6 and a greater length of the wall 51 is disposed to the right of the drainage tube. This causes the side walls 51 and 52 to have bulging portions 56 and 57 while the envelope is in the intermediate stage of fabrication of Figures 5 and 6.

A reticulated separator and drainage structure 58 corresponding to the structure 21—22 in the first embodiment is provided in the envelope 50. This envelope also has a spacing strip 59 secured to the upper edge of side wall 52.

Contraction of the envelope 50 for improving its space factor is accomplished by winding the two parts thereof respectively between the stem 53 and the two ends 61 and 62 in a spiral formation and in a clockwise direction as illustrated in Figure 8. In that part of the envelope to the left of the tube 53, Figures 5 and 6, the side wall 52 will be the outermost side of the envelope in a radial sense, and the wall 51 will be the innermost side of the envelope. Because of the bulge 57 in this outer side of the envelope, the walls 51 and 52 will be disposed in a smooth contiguous relation when the winding operation is completed. The bulge 56 in that part of the envelope to the right of the stem 53 provides an extra length of material for also causing a smooth contiguous relation in this part of the envelope at the end of the spiral winding operation. Spacing strip 59 provides material between the circular convolutions in a manner compensating for the bulk of the separator structure 58 at the bottom of the envelope so the cross-sectional configuration at the upper end of the spirally wound envelope will be congruent with a cross-section at the lower end thereof.

A circular sealing plate 61' which contains a hole for the stem 53 is assembled with the lower edge of the convoluted envelope 50 in the same manner as previously explained with respect to the plate 24 in the first embodiment; that is, a layer of sealing material of adhesive character is provided on the upper side of the plate 61' for establishing a sealing connection between the lower edges 61 and 62 of the envelope side walls 51 and 52. A second circular plate 64, having no central hole for a drainage tube, is similarly attached in sealing relation with the upper edges 65 and 66 of the envelope side walls 51 and 52. This second filtering unit operates in the manner described above in connection with the first embodiment.

Having thus described the preferred embodiments of the invention with the view of clearly and concisely illustrating the same, I claim:

1. In a filter for fluids, a filtering envelope comprising bendable porous flatwise-contiguous side walls secured together about their edges and through which fluid is filterable into the envelope from a fluid body ambient thereto, said side walls having separated edges extending along an edge of said envelope, a flat bendable narrow bendable side-wall separator structure disposed flatwise to and between opposed narrow portions of said side walls extending marginally along said separated edges and cooperable with such portions in forming a drainage channel coextensively with said structure within the envelope, a drainage tube in communicative relation with said drainage channel and projecting outwardly of the envelope from between said side walls at an edge thereof, said envelope and separator structure being bent along fold lines extending transversely across the drainage channel into a zig-zag formation disposing the envelope into a relatively contracted space while said separator structure preserves an open condition of the drainage channel, and a sealing member adhesively attached to the separated side wall edges to close the space therebetween and to serve as means for securing them together.

2. In a filter for fluids, a filtering envelope comprising bendable porous flatwise-contiguous side walls secured together about their edges and through which fluid is filterable into the envelope from a fluid body ambient thereto, said envelope having a drainage passage comprising opposed slightly separated portions of said side walls, a drainage tube in communicative relation with said passage and projecting outwardly of the envelope from between said side walls at an edge thereof, said envelope being bent transversely of said passage to incur a relatively contracted condition, and a bendable reticulated web of at least double thickness disposed in said channel to preserve the open condition of said passage when the envelope is bent.

3. In a filter for fluids, a filtering envelope comprising bendable porous flatwise-contiguous side walls secured together about their edges and through which fluid is filterable into the envelope from a fluid body ambient thereto, said envelope having a narrow elongated drainage passage extending between positions between but adjacent to opposite edges thereof and comprising opposed slightly separated portions of said side walls, said separated wall portions being elongated and substantially narrower than the envelope side walls, a drainage tube in communicative relation with said passage at an intermediate portion thereof and projecting transversely of such passage outwardly of the envelope from between said side walls at an edge of the envelope, said envelope being bent transversely of said passage into a contracted condition, and a flat bendable side-wall separator and fluid drainage structure disposed flatwise to and between said separated side-wall portions for bending with said envelope and to preserve the open condition of said passage when so bent.

4. In a filter for fluids, a filtering envelope comprising bendable porous flatwise-contiguous side walls secured together about certain of their edges and through which fluid is filterable into the envelope from a fluid body ambient thereto, said envelope having a narrow elongated drainage passage extending along an edge from positions between but adjacently to opposite ends thereof and including opposed slightly separated side-wall border portions of which the free edges constitute said edge of the envelope and are also slightly separated, a drainage tube in communicative relation with said drainage passage and projecting transversely thereof from between said free edges, said envelope being bent transversely of said passage into a contracted condition, a flat bendable side-wall separator and fluid drainage structure disposed flatwise to and between said separated wall portions and bent therewith to preserve the open condition of said passage, and a sealing plate associated with said tube and having an adhesive sealing connection with the separated side-wall edges of the bent envelope.

5. In a filter for fluids, a filtering envelope comprising bendable porous flatwise-contiguous side walls secured together about certain of their edges and through which fluid is filterable into the envelope from a fluid body ambient thereto, said envelope having a narrow elongated drainage passage extending along an edge of such envelope from positions between but adjacent to opposite ends thereof and including opposed slightly separated side-wall border portions of which the free edges constitute said edge of the envelope and are also slightly separated, said envelope being bent transversely of the separated side wall edges a sealing plate in an adhesively attached sealing relation with the separated side-wall edges of the bent envelope, and drainage duct means in said plate and in communication with said passage.

HOWARD S. MANWARING.

REFERENCES CITED

The following references are of record in the file of this patent:

UNITED STATES PATENTS

| Number | Name | Date |
|---|---|---|
| 425,431 | Hyatt | Apr. 15, 1890 |
| 1,398,205 | Sirch | Nov. 22, 1921 |
| 1,791,046 | Sweetland | Feb. 3, 1931 |
| 1,805,903 | Bull | May 19, 1931 |
| 1,963,945 | Lyman et al. | June 19, 1934 |
| 2,079,366 | Thomas | May 4, 1937 |
| 2,210,397 | Dreiss | Aug. 6, 1940 |
| 2,218,800 | Williams | Oct. 22, 1940 |
| 2,255,937 | McNamara | Sept. 16, 1941 |
| 2,355,300 | Walker | June 27, 1944 |
| 2,427,862 | Judkins | Sept. 23, 1947 |
| 2,488,726 | Judkins | Nov. 22, 1949 |

FOREIGN PATENTS

| Number | Country | Date |
|---|---|---|
| 5,140 | Australia | Nov. 27, 1931 |
| 19,704 | Switzerland | June 6, 1899 |
| 359,760 | France | Oct. 26, 1905 |